United States Patent
Yamaguchi et al.

(10) Patent No.: US 8,444,216 B2
(45) Date of Patent: May 21, 2013

(54) VEHICLE WIRING STRUCTURE

(75) Inventors: Hiroo Yamaguchi, Saitama (JP); Harumi Takedomi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 187 days.

(21) Appl. No.: 13/130,352

(22) PCT Filed: Dec. 3, 2009

(86) PCT No.: PCT/JP2009/006601
§ 371 (c)(1),
(2), (4) Date: May 20, 2011

(87) PCT Pub. No.: WO2010/070834
PCT Pub. Date: Jun. 24, 2010

(65) Prior Publication Data
US 2011/0233969 A1    Sep. 29, 2011

(30) Foreign Application Priority Data
Dec. 19, 2008  (JP) ................................. 2008-323201

(51) Int. Cl.
*B60K 37/00* (2006.01)
(52) U.S. Cl.
USPC ...................................................... 296/208
(58) Field of Classification Search
USPC ............. 296/208; 165/804; 138/111; 174/47, 174/15.2; 239/731
See application file for complete search history.

(56) References Cited

U.S. PATENT DOCUMENTS

| | | | | |
|---|---|---|---|---|
| 2,242,142 A * | 5/1941 | Parker | ........................... | 180/289 |
| 2,664,458 A * | 12/1953 | Rapata | ....................... | 174/153 G |
| 3,151,905 A * | 10/1964 | Reuther et al. | .................. | 49/167 |
| 3,244,802 A * | 4/1966 | Sturtevant et al. | ......... | 174/153 G |
| 3,424,857 A * | 1/1969 | Kipp et al. | ................ | 174/153 G |
| 5,016,924 A * | 5/1991 | Lin | ............................ | 285/179.1 |
| 5,545,046 A * | 8/1996 | Masuda et al. | ................ | 439/142 |
| 5,691,506 A | 11/1997 | Miyazaki et al. | | |
| 5,806,139 A * | 9/1998 | Anderson et al. | ................ | 16/2.1 |
| 5,911,450 A * | 6/1999 | Shibata et al. | ............. | 29/407.04 |
| 5,984,719 A * | 11/1999 | Flegel | ........................... | 439/528 |
| 6,257,923 B1 * | 7/2001 | Stone et al. | .................... | 439/502 |
| 6,299,177 B1 * | 10/2001 | Rehberg et al. | ............... | 277/634 |

(Continued)

FOREIGN PATENT DOCUMENTS

| DE | 199 59 123 A1 | 6/2001 |
|---|---|---|
| DE | 101 09 666 A1 | 9/2002 |

(Continued)

*Primary Examiner* — Kiran B Patel
(74) *Attorney, Agent, or Firm* — Arent Fox LLP

(57) ABSTRACT

A vehicle wiring structure equipped with a pipe (20), the two ends of which are inserted into the vehicle through an electrical-load-side through-hole and a power-source-side through-hole provided in the floor, and power cables (40*a*, 40*b*, 41), which are inserted in the pipe (20) and connect a power source and electrical loads. The power cables pulled out of the end part of the pipe (20) inserted through the power-source-side through-hole (60) are restrained by a first cable guide (70) provided inside the vehicle and are wired to a power source connection part, while the end part of the pipe (20) inserted through the power-source-side through-hole (60) reaches as far as the position where the first cable guide (70) is provided. The pipe (20) is supported by a through-hole seal member (61) that has a pipe through-hole (62) through which the pipe (20) passes and that closes the power-source-side through-hole (60).

6 Claims, 5 Drawing Sheets

U.S. PATENT DOCUMENTS

| | | | |
|---|---|---|---|
| 6,439,923 B1 * | 8/2002 | Kirkendall et al. | 439/502 |
| 6,460,642 B1 * | 10/2002 | Hirano | 180/65.1 |
| 6,680,433 B2 | 1/2004 | Hashizawa et al. | |
| 6,793,532 B2 * | 9/2004 | Saito et al. | 439/607.41 |
| 7,002,077 B2 * | 2/2006 | Pyron | 174/652 |
| 7,100,237 B2 * | 9/2006 | Katayama | 16/2.1 |
| 7,172,042 B2 * | 2/2007 | Yamaguchi et al. | 180/65.1 |
| 7,497,284 B2 * | 3/2009 | Yamaguchi et al. | 180/65.1 |
| 7,794,280 B1 * | 9/2010 | Markyvech | 439/620.29 |
| 7,973,250 B2 * | 7/2011 | Groeller et al. | 174/481 |
| 7,988,453 B2 * | 8/2011 | Loo et al. | 439/34 |
| 8,042,225 B2 * | 10/2011 | Bringhenti | 16/2.2 |
| 8,264,098 B2 * | 9/2012 | Yoshinaga et al. | 307/9.1 |
| 2002/0157843 A1 | 10/2002 | Fukushima et al. | |
| 2006/0137893 A1 * | 6/2006 | Sumi et al. | 174/84 R |
| 2010/0315040 A1 * | 12/2010 | Sakurai | 320/109 |
| 2011/0217014 A1 * | 9/2011 | Dominique | 385/134 |

FOREIGN PATENT DOCUMENTS

| | | |
|---|---|---|
| JP | 09-039688 A | 2/1997 |
| JP | 11-178164 A | 7/1999 |
| JP | 2005-218189 A | 8/2005 |
| JP | 2006-349087 A | 12/2006 |
| JP | 2007-008423 A | 1/2007 |
| JP | 2007-26821 A | 2/2007 |
| WO | WO 2008/337710 A1 | 4/2008 |

* cited by examiner

VEHICLE WIRING STRUCTURE

CROSS-REFERENCE TO RELATED APPLICATION

This application is a National Stage entry of International Application No. PCT/JP2009/006601, filed Dec. 3, 2009, which claims priority to Japanese Patent Application No. 2008-323201 filed Dec. 19, 2008, the disclosure of the prior application is incorporated in its entirety by reference.

TECHNICAL FIELD

The present invention relates to a wiring structure for a vehicle to connect between a power source and an electrical load equipped in a vehicle by a power cable.

BACKGROUND ART

Conventionally, for example, in a hybrid vehicle having an engine and a motor as a driving source, there is known a vehicle wiring structure for connecting between the motor disposed in the engine room in the front portion of the vehicle and the battery or PDU (Power Drive Unit) provided in the vicinity of the trunk room in the rear portion of the vehicle, by a power cable which is inserted through a metal pipe disposed in the under surface of the floor of the vehicle (for example, refer to Japanese Patent Laid-Open Publication No. 2005-218189).

SUMMARY OF THE INVENTION

Problems to be Solved by the Invention

In the above described conventional vehicle wiring structure, the power cable inserted through the pipe is regulated by the pipe as far as to the end part of the pipe inserted in the trunk room. However, regarding further wiring from the end part to the power source, the vehicle assembly operator needs to wire the power cable to a recessed place by avoiding other disposed components or the like. This is a disadvantage as being inefficient in workability.

Moreover, in a case where the power cable is wired by being inserted through a metal pipe, it is able to reduce the influence of high-frequency noise to the inside of the metal pipe by connecting the metal pipe to the body earth of the vehicle. However, there is a disadvantage of deterioration of resistance properties against high-frequency noise at wiring portions further from the metal pipe.

In addition, when the power cable is barely formed in the wiring further from the metal pipe, there is a disadvantage that the power cable is subject to breakage when the vehicular crashes or the like.

In this regard, it is the object of the present invention to provide a vehicle wiring structure which aims to improve the workability of power cable wiring, to improve resistance properties against high-frequency noise, and to increase the wiring strength.

Means for Solving the Problems

The present invention was made to fulfill the above object and relates to a vehicle wiring structure which uses a power cable to connect between a power source and an electrical load disposed inside a vehicle with a space therebetween in a vehicle front-to-back direction, comprising a pipe disposed on floor undersurface of the vehicle between a position below where the power source is installed and a position below where the electrical load is installed, and two ends thereof are inserted into the vehicle via a power-source-side through-hole and an electrical-load-side through-hole provided in the floor, and a power cable inserted through an inside of the pipe and which connects the power source and the electrical load.

Moreover, the present invention is characterized in that the power cable pulled out of an end part of the pipe inserted through the power-source-side through-hole, is restrained by a first cable guide provided inside the vehicle and is wired to a connection part of the power source, and the end part of the pipe inserted through the power-source-side through-hole reaches as far as a position where the first cable guide is provided, and the pipe is supported by a through-hole seal member which has a pipe through-hole through which the pipe passes, and which closes the power-source-side through-hole.

According to the present invention, the end part of the pipe inserted through the power-source-side through-hole reaches as far as the position where the first cable guide is provided. Therefore, the vehicle wiring operator can ensure a wiring route of the power cable pulled out of the end part of the pipe along the first cable guide and is able to easily connect the power cable to the power source. Moreover, the pipe passes through the pipe through-hole and is supported by the through-hole seal member which closes the power-source-side through-hole. Therefore, the cable and an edge of the power-source-side through-hole do not interfere, and since the power cable pulled out of the end part of the pipe is protected by the first cable guide, it is able to increase the intensity of the power cable against crash or the like.

Moreover, the present invention is characterized in that the pipe through-hole of the through-hole seal member is formed of seal resin, and supports the passed through pipe via the seal resin.

According to the present invention, by supporting the pipe via the pipe through-hole formed by a seal resin, it is able to facilitate the passing through operation of the pipe through the pipe through-hole, and to fixedly support the pipe to the pipe through-hole by the adhesiveness of the seal resin after passing it through.

Moreover, the present invention is characterized in that the pipe through-hole is formed of seal resin integrally with a grommet for protecting the power cable pulled out of the end part of the pipe from the edge of the end part.

According to the present invention, it is able to proceed the operation to fit the grommet to the pipe end part along with the operation to pass through the pipe through the pipe through-hole, thereby improving the workability of the power cable wiring.

Moreover, the present invention is characterized in that a center of the pipe through-hole of the through-hole seal member is misaligned from a center of a closing part of the power-source-side through-hole of the through-hole seal member.

According to the present invention, when assembling the through-hole seal member to the power-source-side through-hole in a state where the pipe is passed through the pipe through-hole, the position of the pipe is misaligned from the center of the power-source-side through-hole, and thereby facilitates the operation at the opposite side in respect the misaligned direction. As such, it is able to facilitate the attachment of the through-hole seal member.

Moreover, the present invention is characterized in that the pipe is made from metal and is grounded to a body earth of the vehicle.

According to the present invention, since the end part of the pipe which is grounded to the vehicle body earth is inserted as far as to reach the first cable guide, it is able to reduce the effect of the high-frequency noise against the power cable.

Moreover, the present invention is characterized in that the connection part of the power-source-side through-hole and the power cable of the power source is disposed with a space therebetween in a vehicle right-to-left direction, and comprising a second cable guide which inflects the power cable protruding in the vehicle front-to-back direction via the first cable guide, to a direction of the connection part of the power source and the power cable.

According to the present invention, the vehicle wiring operator can easily change the wiring direction of the power cable pulled out of the end part of the pipe inserted through the power-source-side through-hole, along the first cable guide and the second cable guide, and connect the power cable to the power source.

BEST MODE FOR CARRYING OUT THE INVENTION

Figure 1:
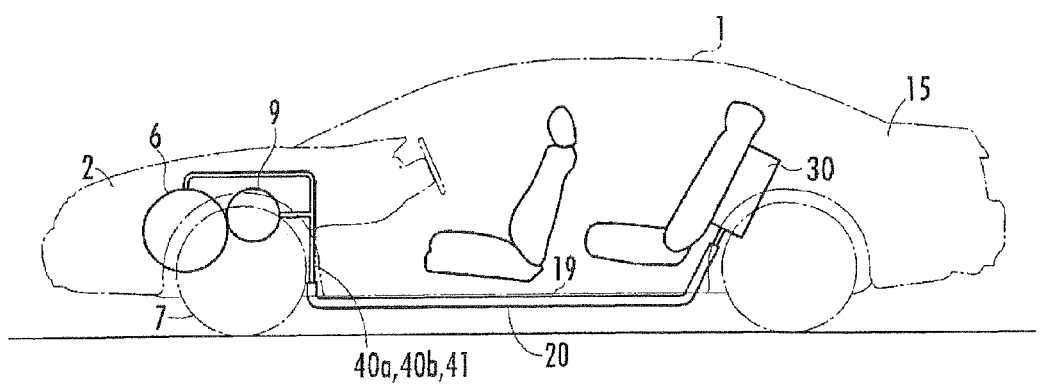
FIG. 1 A configuration diagram of a vehicle wiring structure of the present invention applied to a hybrid vehicle.

An embodiment of the present invention will be explained referring to FIGS. 1 to 7. FIG. 1 is a configuration diagram of a vehicle wiring structure of the present invention applied to a hybrid vehicle, and FIG. 2 is a configuration diagram of main parts of the hybrid vehicle shown in FIG. 1.

Figure 2:
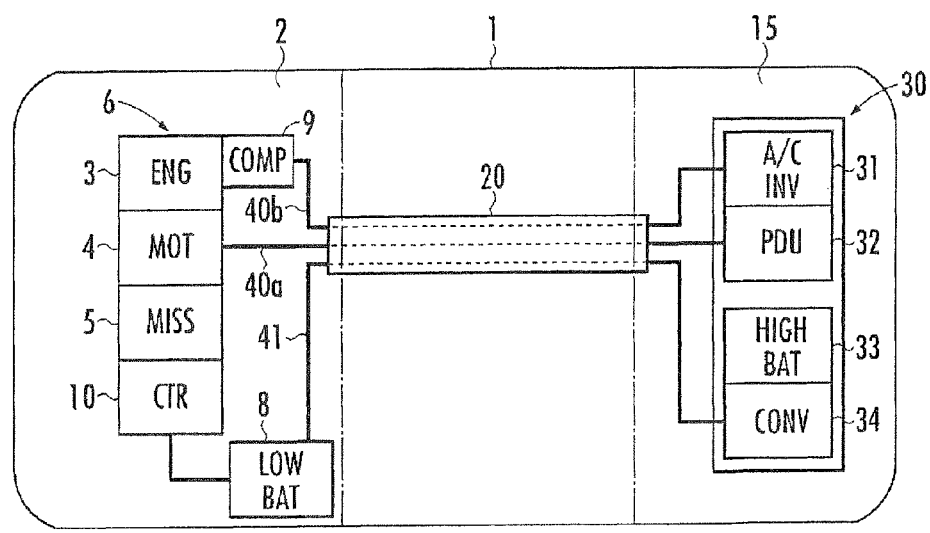
FIG. 2 A configuration diagram of main parts of the hybrid vehicle shown in FIG. 1.

Referring to FIGS. 1 and 2, a power unit 6 comprising an engine 3, a motor generator 4 (which corresponds to the electrical load of the present invention), an automatic transmission 5, an electric compressor 9 for an air-conditioning unit 9 (which corresponds to the electrical load of the present invention), a low voltage battery 8, and a controller 10 for controlling the operation and the like of the engine 3, is disposed in an engine room 2 at the vehicle front portion of the hybrid vehicle 1.

The motor generator 4 is a three-phase DC brushless motor, and the driving force of the motor generator 4 and the engine 3 is transmitted to a front wheel 7, which is the drive wheel, via the automatic transmission 5. Furthermore, when the speed of the hybrid vehicle 1 is reduced and the like, the driving force is transmitted from the front wheel 7 to the motor generator 4, and the motor generator 4 functions as the power generator. Then, the generated electric power of the motor generator 4 is collected at a high voltage battery 33 via a motor inverter 32.

The electric compressor 9 is provided with a compressor motor (not illustrated), and the driving shaft of the compressor motor is linkable with the crankshaft of the engine 3. The compressor motor is a three-phase motor, and electric power is provided to the compressor motor from a compressor inverter 31.

A power source unit 30 (which corresponds to the power source of the present invention) is disposed in a trunk room 15 at the rear portion of the hybrid vehicle 1. The motor inverter 32 for a rotational control of the motor generator 4, the compressor inverter 31 for a rotational control of the electric compressor 9, the high voltage battery 33, and a DC/DC converter 34 for depressing the output voltage of the high voltage battery 33, is housed in the power source unit 30.

The motor inverter 32 converts a direct current electricity provided form the high voltage battery 33 to a three-phase alternating current electricity and drives the motor generator 4. Furthermore, the compressor inverter 31 also converts the direct current electricity provided form the high voltage battery 33 to a three-phase alternating current electricity and drives the compressor 9.

The motor generator 4 and the motor inverter 32 are connected by a three-phase power cable 40a for the motor. Similarly, the compressor 9 and the compressor inverter 31 are connected by a three-phase power cable 40b for the compressor. Furthermore, the DC/DC converter 34 and the low voltage battery 8 are connected by a low voltage power cable 41 for providing electric power used for the operation of the controller or the like and for charging the low voltage battery 8.

At the undersurface of a floor 19 of the hybrid vehicle 1, there is disposed a metal pipe 20 with its one end inserted in the engine room 2 and the other end inserted in the trunk room 15. And the power cable 40a for the motor, the power cable 40b for the compressor, and the low voltage power cable 41 are inserted through the metal pipe 20, thereby connecting between the power unit 6 of the engine room 2 and the electric unit 30 of the trunk room 15.

The metal pipe 20 is connected to a body earth of the hybrid vehicle 1. Accordingly, the resistance properties of cables 40a, 40b, and 41 against high-frequency are improved.

Figure 3:
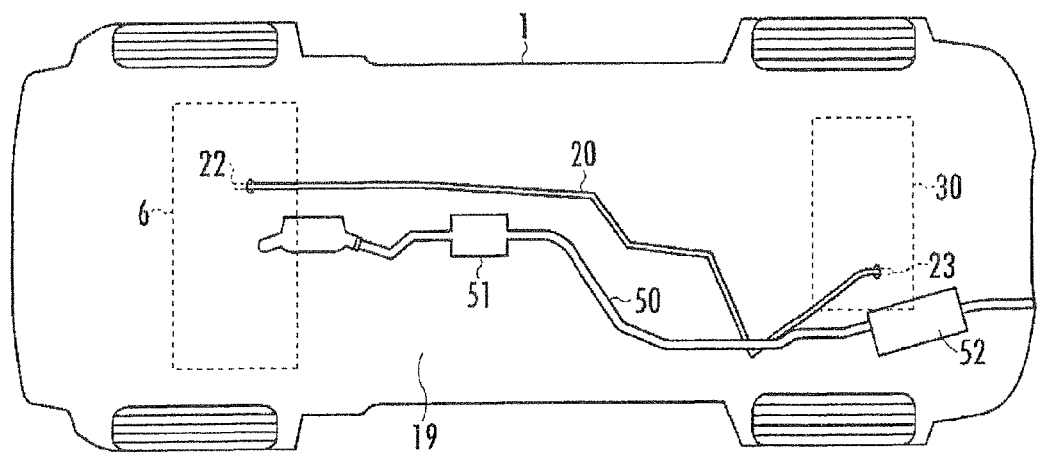
FIG. 3 A configuration diagram of floor undersurface of the hybrid vehicle and a cross-section diagram of the metal pipe inserted with the power cables.

FIG. 3 shows the configuration of the undersurface of the floor 19 of the hybrid vehicle 1, wherein one of an end part 22 of the metal pipe 20 is inserted to reach the vicinity of the power unit 6 disposed in the engine room 2, and a other end part 23 is inserted to reach the vicinity of the electric unit 30 disposed in the trunk room 15.

Furthermore, an exhaust pipe 50 of the engine 3 is disposed at the undersurface of the floor 19, and an bottommost part 21 of the metal pipe 20 in the vertical direction is arranged at a position adjacent to the exhaust gas purification CAT 51 (catalyst) provided at a point along the exhaust pipe 50. In addition, a muffler 52 is provided at a rear position of the exhaust pipe 50.

Figure 4:
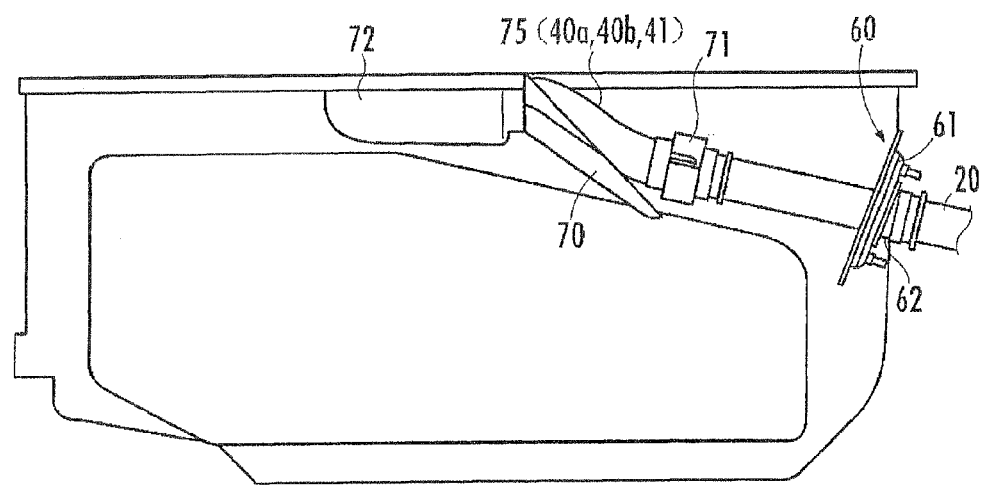
FIG. 4 A explanatory diagram of the insert part of the metal pipe to the floor undersurface viewed from the floor side surface.

Next, FIG. 4 is an explanatory diagram (perspective diagram) of the insert part of the metal pipe 20 to the floor undersurface viewed from the floor side surface. The metal pipe 20 passes through a pipe through-hole 62 of a through-hole seal member 61 attached to a power-source-side through-hole 60 provided on the floor under surface, and is inserted as far as to reach the place where a first cable guide 70 is disposed.

The power cables (40a, 40b, 41), which are laid through the metal pipe 20 and are pulled out of the end part of the metal pipe 20, are protected from the edge of the end part of the metal pipe 20 by the grommet 71 attached to the end part of the metal pipe 20. And, the power cables (40a, 40b, 41) are provided with a coating 75 by a metal braided shield, a tape winding, or a corrugated tube or the like, and then wired along the first cable guide 70 and a second cable guide 72.

Figure 5:
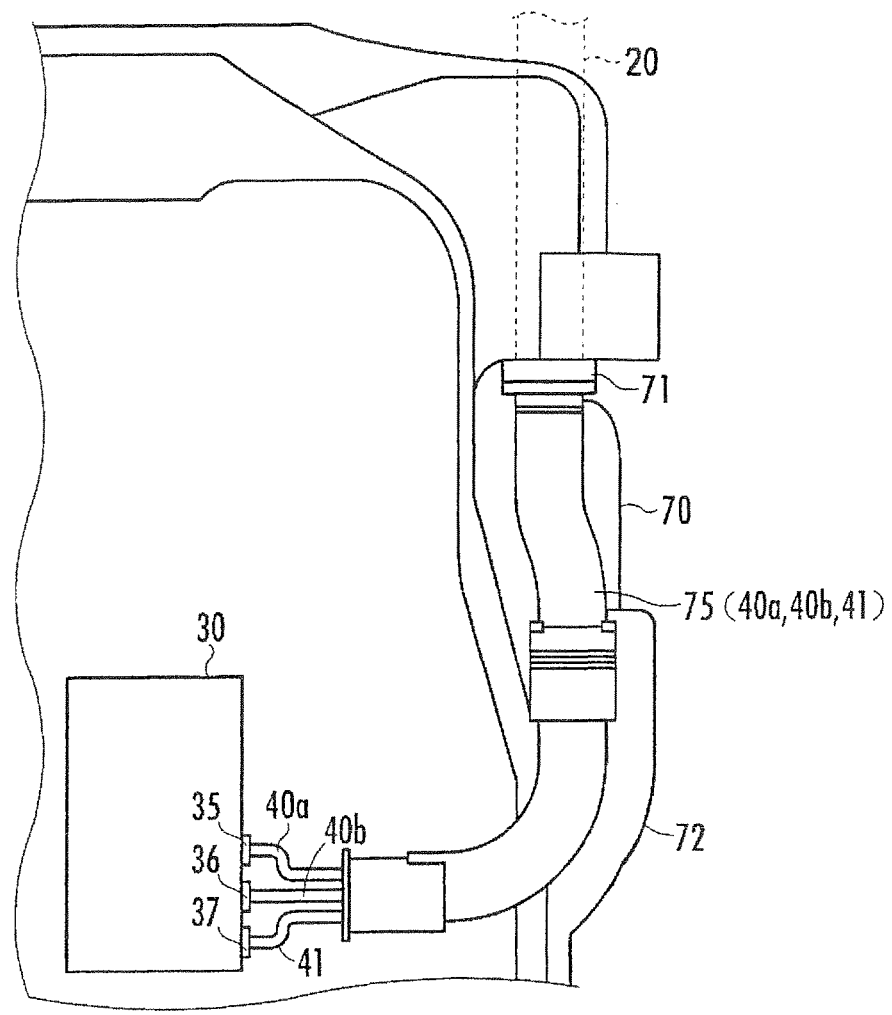
FIG. 5 A explanatory diagram of the wiring of the power cable pulled out of the metal pipe viewed from the floor upper surface.
Figure 6:
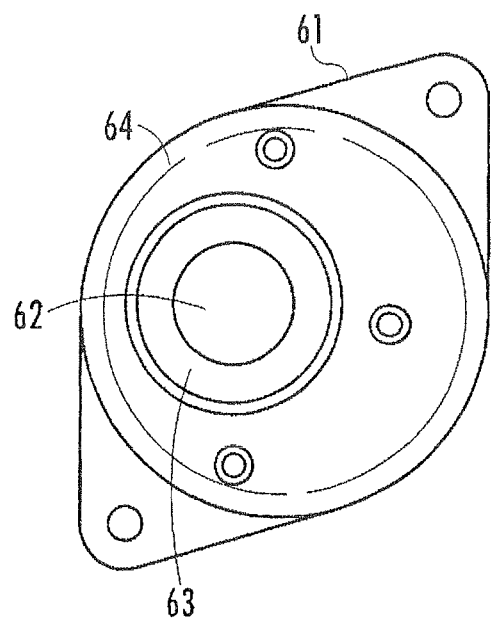
FIG. 6 A detailed drawing of the through-hole seal member.
Figure 6:
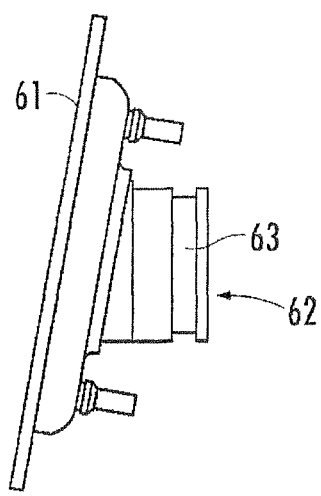
Figure 7:
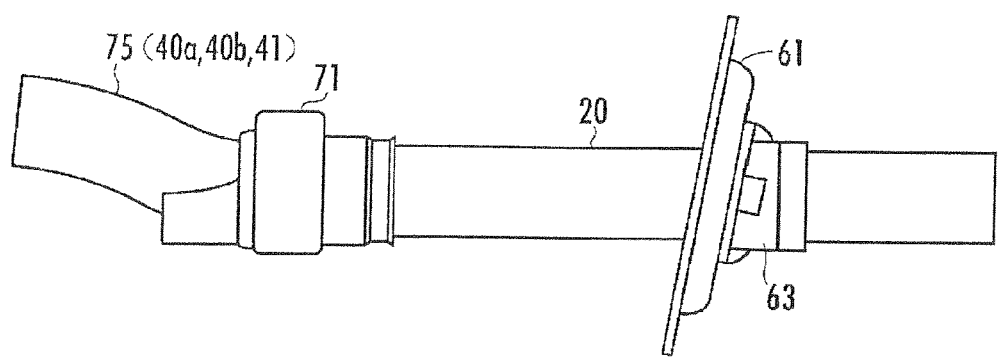
FIG. 7 An explanatory diagram of the pipe member attached to the grommet and the through-hole seal member.
Figure 7:
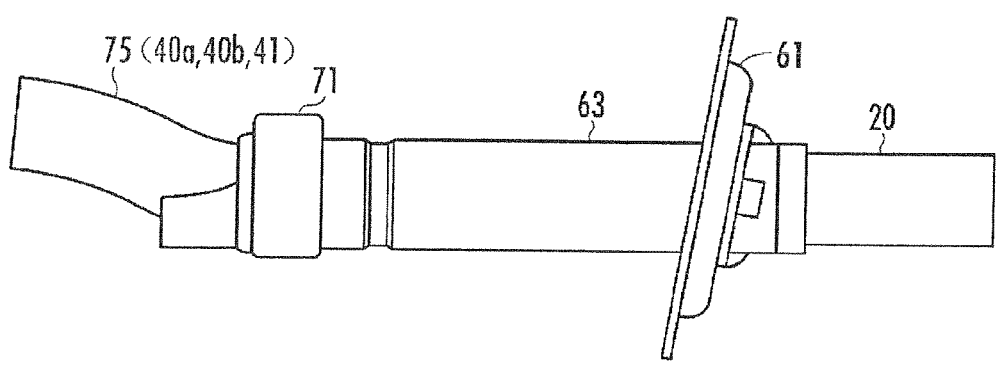

Furthermore, FIG. 5 is an explanatory diagram of the wiring of the power cables (40a, 40b, 41) pulled out of the metal pipe 20 viewed from the floor upper surface. The power cables (40a, 40b, 41) further ahead of a grommet 71 are restrained by the first cable guide 70 and wired to the second cable guide 72, and are restrained by the second cable guide 72 to change the wiring direction from vehicle front-to-back direction to right-to-left direction.

Then, the power cables (40a, 40b, 41) are connected to a power source unit 30 which is disposed misaligned in the right-to-left direction of the vehicle with respect the power-source-side through hole 60, via connectors 35, 36, and 37.

As shown in FIGS. 4 and 5, the metal pipe 20 is inserted as far as the place where the first cable guide 71 is disposed, the wiring operator of vehicle 1 is able to lead the power cables (40a, 40b, 41) as far as to the first cable guide 71 by extending out the power cables (40a, 40b, 41) from the side of the metal pipe 20.

Furthermore, as described above, the wiring operator can easily wire the power cables (40a, 40b, 41) to the connection part of the power source unit 30, by pulling out the power cables (40a, 40b, 41) led to a first cable guide 70 and leading them along the first cable guide 70 and the second cable guide 72.

Next, FIGS. 6(a) and 6(b) are detailed drawings of the above described through-hole seal member 61. In the through-hole seal member 61, there is formed the pipe through-hole 62 in which a seal resin pipe member 63 is inserted. And, a center C2 of a pipe through-hole 62 is misaligned from a center C1 of a circular plate part 64 which is attached covering the power-source-side through-hole. By this, the workability of attaching the through-hole seal member 61 to the power-source-side through-hole 60 is improved.

As shown in FIG. 7(a), in the present embodiment, the grommet 71 and the pipe member 63 attached to the through-hole seal member 61 are different parts. However, as shown in FIG. 7(b), the pipe member 63 attached to the through-hole seal member 61 may be extended to the grommet 71 and integrated.

Furthermore, in the present embodiment, a metal pipe was described as the pipe through which the power cable is inserted in the present invention. However, the effect of the present invention can be achieved in a case where a pipe made of other materials, such as resin or the like is used.

Furthermore, in the present embodiment, although the center of the pipe through-hole of the through-hole seal member is formed misaligned from the center of the part of the through-hole seal member covering the power-source-side through-hole, it may be formed concentric with this part.

INDUSTRIAL APPLICATION

As described above, the vehicle wiring structure of the present invention is able to improve the workability of power cable wiring, to improve resistance properties against high-frequency noise, and to increase the wiring strength, thereby being useful for vehicle wiring.

The invention claimed is:

1. A vehicle wiring structure which uses a power cable to connect between a power source and an electrical load device disposed inside a vehicle with a space therebetween in a vehicle front-to-back direction, comprising;
   a pipe disposed under a floor of the vehicle between a position below where the power source is installed and a position below where the electrical load device is installed, and having opposite ends thereof inserted into the vehicle via a power-source-side through-hole and an electrical-load-side through-hole provided in the floor;
   a power cable inserted through the pipe connecting the power source and the electrical load device;
   a first cable guide provided inside the vehicle restraining the power cable adjacent the end of the pipe inserted through the power-source-side through-hole, the power cable being wired to a connection part of the power source, and the end of the pipe inserted through the power-source-side through-hole extending to the first cable guide; and
   a through-hole seal member having a pipe through-hole through which the pipe passes and supporting the pipe, the seal member closing the power-source-side through-hole.

2. The vehicle wiring structure according to claim 1, wherein the pipe through-hole of the through-hole seal member is formed of a seal resin, and the pipe is supported by the seal resin.

3. The vehicle wiring structure according to claim 2, wherein the pipe through-hole includes a grommet protecting the power cable from an edge of the end of the pipe.

4. The vehicle wiring structure according to claim 1, wherein a center of the pipe through-hole of the through-hole seal member is not the same as a center of a closing part of the power-source-side through-hole.

5. The vehicle wiring structure according to claim 1, wherein the pipe is made from metal and is grounded to a body of the vehicle.

6. The vehicle wiring structure according to claim 1, wherein the power-source-side through-hole and the connection part of the power source are disposed with a space therebetween in a vehicle right-to-left direction, and
   wherein a second cable guide bends the power cable protruding from the first cable guide in the vehicle front-to-back direction, to a direction toward the connection part of the power source.

* * * * *